US011403490B2

(12) United States Patent
Arik et al.

(10) Patent No.: US 11,403,490 B2
(45) Date of Patent: Aug. 2, 2022

(54) REINFORCEMENT LEARNING BASED LOCALLY INTERPRETABLE MODELS

(71) Applicant: Google LLC, Mountain View, CA (US)

(72) Inventors: Sercan Omer Arik, San Francisco, CA (US); Jinsung Yoon, San Jose, CA (US); Tomas Jon Pfister, Foster City, CA (US)

(73) Assignee: Google LLC, Mountain View, CA (US)

( * ) Notice: Subject to any disclaimer, the term of this patent is extended or adjusted under 35 U.S.C. 154(b) by 128 days.

(21) Appl. No.: 17/030,316

(22) Filed: Sep. 23, 2020

(65) Prior Publication Data

US 2021/0089828 A1    Mar. 25, 2021

Related U.S. Application Data

(60) Provisional application No. 62/904,977, filed on Sep. 24, 2019.

(51) Int. Cl.
| | |
|---|---|
| *G06K 9/62* | (2022.01) |
| *G06N 3/02* | (2006.01) |
| *G06N 5/00* | (2006.01) |
| *G06N 20/20* | (2019.01) |

(52) U.S. Cl.
CPC ......... *G06K 9/6257* (2013.01); *G06K 9/6231* (2013.01); *G06K 9/6265* (2013.01);
(Continued)

(58) Field of Classification Search
None
See application file for complete search history.

(56) References Cited

U.S. PATENT DOCUMENTS

| | | | |
|---|---|---|---|
| 5,805,730 A | * | 9/1998 | Yaeger ................. G06K 9/6217 382/229 |
| 9,767,410 B1 | | 9/2017 | Guevara et al. |

(Continued)

OTHER PUBLICATIONS

Georgevici AI, Terblanche M. Neural networks and deep learning: a brief introduction. Intensive Care Medicine. May 2019;45(5):712-4. (Year: 2019).*

(Continued)

*Primary Examiner* — Emily C Terrell
*Assistant Examiner* — Nathan J Bloom
(74) *Attorney, Agent, or Firm* — Honigman LLP; Brett A. Krueger

(57) ABSTRACT

A method for training a locally interpretable model includes obtaining a set of training samples and training a black-box model using the set of training samples. The method also includes generating, using the trained black-box model and the set of training samples, a set of auxiliary training samples and training a baseline interpretable model using the set of auxiliary training samples. The method also includes training, using the set of auxiliary training samples and baseline interpretable model, an instance-wise weight estimator model. For each auxiliary training sample in the set of auxiliary training samples, the method also includes determining, using the trained instance-wise weight estimator model, a selection probability for the auxiliary training sample. The method also includes selecting, based on the selection probabilities, a subset of auxiliary training samples and training the locally interpretable model using the subset of auxiliary training samples.

20 Claims, 6 Drawing Sheets

(52) U.S. Cl.
CPC .............. *G06N 3/02* (2013.01); *G06N 5/003* (2013.01); *G06N 20/20* (2019.01)

(56) References Cited

U.S. PATENT DOCUMENTS

2019/0324856 A1* 10/2019 Zhao ..................... G06T 1/20
2020/0019888 A1* 1/2020 McCourt ............... G06N 7/005
2020/0356875 A1* 11/2020 Wang .................... G06N 20/00

OTHER PUBLICATIONS

Pouyanfar S, Sadiq S, Yan Y, Tian H, Tao Y, Reyes MP, Shyu ML, Chen SC, Iyengar SS. A survey on deep learning: Algorithms, techniques, and applications. ACM Computing Surveys (CSUR). Sep. 18, 2018;51(5):1-36. (Year: 2018).*

H. Zhang and W. K. Chan, "Apricot: A Weight-Adaptation Approach to Fixing Deep Learning Models," 2019 34th IEEE/ACM International Conference on Automated Software Engineering (ASE), 2019, pp. 376-387, doi: 10.1109/ASE.2019.00043. (Year: 2019).*

Bloniarz et al., "Supervised neighborhoods for distributed nonparametric regression," May 9, 2016, 10 pages.

Ribeiro et al., "Why Should I Trust You?" "Explaining the Predictions of Any Classifier," Aug. 13, 2016, 10 pages.

Yoon et al., "RL-LIM: Reinforcement Learning-based Locally Interpretable Modleing," Sep. 26, 2019, 18 pages.

Guidotti et al., "A Survey of Methods for Explaining Black Box Models," Aug. 22, 2018, 42 pages.

International Search Report, PCT/US2020/052326, dated Apr. 20, 2021, 15 pages.

* cited by examiner

REINFORCEMENT LEARNING BASED LOCALLY INTERPRETABLE MODELS

CROSS REFERENCE TO RELATED APPLICATIONS

This U.S. patent application is a continuation of, and claims priority under 35 U.S.C. § 120 from, U.S. Provisional Application 62/904,977, filed on Sep. 24, 2019. The disclosure of this prior application is considered part of the disclosure of this application and is hereby incorporated by reference in its entirety.

TECHNICAL FIELD

This disclosure relates to reinforcement learning based locally interpretable models.

BACKGROUND

Artificial intelligence is advancing at a rapid pace, particularly with recent advances in deep neural networks and ensemble methods. This progress has been fueled by 'black-box' machine learning models where complex non-linear interactions between many parameters control the decision making. The complex interactions make using the machine learning models difficult for a user to understand and interpret. In many real-world applications, machine learning models are not only expected to perform well but are also required to be interpretable. Often, there is a trade-off between performance and interpretability of machine learning models, where machine learning models with a high level of interpretability suffer from degraded performance.

SUMMARY

One aspect of the disclosure provides a method for reinforcement learning based locally interpretable models. The method includes, obtaining, at data processing hardware, a set of training samples and training, by the data processing hardware, using the set of training samples, a black-box model. The method also includes, generating, by the data processing hardware, using the trained black-box model and the set of training samples, and set of auxiliary training samples. The method also includes, training, by the data processing hardware, using the set of auxiliary training samples, a baseline interpretable model and training, by the data processing hardware, using the set of auxiliary training samples and baseline interpretable model, an instance-wise weight estimator model. For each auxiliary training sample in the set of auxiliary training samples, the method includes determining, by the data processing hardware, using the trained instance-wise weight estimator model, a selection probability for the auxiliary training samples. The method also includes selecting, by the data processing hardware, based on the selection probabilities, a subset of auxiliary training samples from the set of auxiliary training samples and training, by the data processing hardware, using the subset of auxiliary training samples, the locally interpretable model.

Implementations of the disclosure may include one or more of the following optional features. In some implementations, training the instance-wise weight estimator model includes determining a reinforcement signal and updating the instance-wise weight estimator model based on the reinforcement signal. Determining the reinforcement signal may include determining first loss data for the locally interpretable model based on a loss function, determining second loss data for the locally interpretable model based on a loss function, and determining the reinforcement signal based on the first loss data for the locally interpretable model and the second loss data for the baseline interpretable model.

Selecting the subset of auxiliary training samples from the set of auxiliary training samples may include, for each auxiliary training sample in the set of auxiliary training samples determining, based on the selection probability, a corresponding selection value indicating either selection or no selection. When the corresponding selection value indicates selection, add the auxiliary training sample into the subset of auxiliary training samples. In some examples, determining, for each auxiliary training sample, the selection probability for the auxiliary training sample includes receiving, at the instance-wise weight estimator model, a validation sample and determining, by the instance-wise weight estimator model, the selection probability based on the validation sample.

In some implementations, the method further includes, after training the instance-wise weight estimator model receiving, at the instance-wise weight estimator model, a validation sample and generating, by the instance-wise weight estimator model, the selection probability for each auxiliary training sample in the set of auxiliary training samples. In these implementations, the method also includes, training the locally interpretable model based on the validation sample and the selection probabilities of each auxiliary training sample in the set of auxiliary training samples. Optionally, training the black-box model may include minimizing a mean squared error loss function or a cross-entropy loss function.

Each training sample in the set of training samples may include training data and a given label. In some examples, generating the set of auxiliary training samples includes, for each training sample in the set of training samples obtaining, from the trained black-box model, using the training data of the training sample, a predicted label for the training data, combining the training data and the predicted label into an auxiliary training sample, and adding the auxiliary training sample to the set of auxiliary training samples.

In some implementations, training the instance-wise weight estimator model includes obtaining a set of probe training samples and for each probe training sample in the set of probe training samples, determining a selection probability. In these implementations, determining, based on the selection probability of each probe training sample, an instance-wise selection vector, optimizing the locally interpretable model based on the instance-wise selection vector, and updating the instance-wise weight estimator model based on loss data from the optimized locally interpretable model.

Another aspect of the disclosure provides a system for reinforcement learning based locally interpretable models. The system includes data processing hardware and memory hardware in communication with the data processing hardware. The memory hardware stores instructions that when executed on the data processing hardware cause the data processing hardware to perform operations. The operations include obtaining a set of training samples and training using the set of training samples, a black-box model. The operations also include, generating, using the trained black-box model and the set of training samples, and set of auxiliary training samples. The operations also include, training, using the set of auxiliary training samples, a baseline interpretable model and training, using the set of auxiliary training samples and baseline interpretable model, an instance-wise weight estimator model. For each auxiliary training sample in the set of auxiliary training samples, the operations include determining, using the trained instance-wise weight estimator model, a selection probability for the auxiliary training samples. The operations also include selecting, based on the selection probabilities, a subset of auxiliary training samples from the set of auxiliary training samples and training, using the subset of auxiliary training samples, the locally interpretable model.

This aspect may include one or more of the following optional features. In some implementations, training the instance-wise weight estimator model includes determining a reinforcement signal and updating the instance-wise weight estimator model based on the reinforcement signal. Determining the reinforcement signal may include determining first loss data for the locally interpretable model based on a loss function, determining second loss data for the locally interpretable model based on a loss function, and determining the reinforcement signal based on the first loss data for the locally interpretable model and the second loss data for the baseline interpretable model.

Selecting the subset of auxiliary training samples from the set of auxiliary training samples may include, for each auxiliary training sample in the set of auxiliary training samples determining, based on the selection probability, a corresponding selection value indicating either selection or no selection. When the corresponding selection value indicates selection, add the auxiliary training sample into the subset of auxiliary training samples. In some examples, determining, for each auxiliary training sample, the selection probability for the auxiliary training sample includes receiving, at the instance-wise weight estimator model, a validation sample and determining, by the instance-wise weight estimator model, the selection probability based on the validation sample.

In some implementations, the operations further include, after training the instance-wise weight estimator model receiving, at the instance-wise weight estimator model, a validation sample and generating, by the instance-wise weight estimator model, the selection probability for each auxiliary training sample in the set of auxiliary training samples. In these implementations, the operations also include, training the locally interpretable model based on the validation sample and the selection probabilities of each auxiliary training sample in the set of auxiliary training samples. Optionally, training the black-box model may include minimizing a mean squared error loss function or a cross-entropy loss function.

Each training sample in the set of training samples may include training data and a given label. In some examples, generating the set of auxiliary training samples includes, for each training sample in the set of training samples obtaining, from the trained black-box model, using the training data of the training sample, a predicted label for the training data, combining the raining data and the predicted label into an auxiliary training sample, and adding the auxiliary training sample to the set of auxiliary training samples.

In some implementations, training the instance-wise weight estimator model includes obtaining a set of probe training samples and for each probe training sample in the set of probe training samples, determining a selection probability. In these implementations, determining, based on the selection probability of each probe training sample, an instance-wise selection vector, optimizing the locally interpretable model based on the instance-wise selection vector, and updating the instance-wise weight estimator model based on loss data from the optimized locally interpretable model.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

In many real-world applications, artificial intelligence (AI) systems are expected to not only perform well but also be interpretable. For example, doctors need to understand why a particular treatment is recommended, and financial institutions need to understand why a loan was declined. Often with AI systems there is a trade-off between performance and interpretability of the system. In particular, globally interpretable models, which attempt to explain the entire model behavior, typically yield considerably worse performance than black-box models. However, an advantageous alternative to the globally interpretable model may include locally interpretable models.

Locally interpretable models explain a single prediction within the model while globally interpretable models attempt to explain the entire model. While a globally interpretable model fits a single inherently interpretable model to an entire training set, locally interpretable models aim to fit an inherently interpretable model locally by distilling knowledge from a high performance black-box model. Locally interpretable models may be useful to provide succinct and human-like explanations to users. To optimize performance, locally interpretable models need to maximize two objectives: (i) overall prediction performance and (ii) fidelity. The overall prediction performance represents how well the locally interpretable model predicts an outcome compared to a ground truth label. Fidelity represents how well the locally interpretable model approximates the black-box model predictions. One fundamental challenge of locally interpretable models is the representational capacity difference while applying distillation. That is, black-box machine learning models have a much larger representational capacity than locally interpretable models. The lower representational capacity of the locally interpretable model may result in underfitting with conventional distillation techniques, leading to suboptimal performance.

Implementations herein are directed toward a model trainer that provides a reinforcement learning-based method to fit locally interpretable models (RL-LIM). The RL-LIM efficiently utilizes the small representational capacity of locally interpretable models by training with a small number of samples that provide the highest value contribution to fitting the locally interpretable model. In order to select these highest-value samples or instances, the model trainer trains an instance-wise weight estimator using a reinforcement signal that quantifies a fidelity metric. Selecting the high-value instances rewards predictions that closely resemble the black-box model predictions. Training the locally interpretable model by selecting only high-value training instances nearly matches the performance of black-box models and significantly outperforms alternative techniques in terms of overall prediction performance and fidelity metrics.

Figure 1:
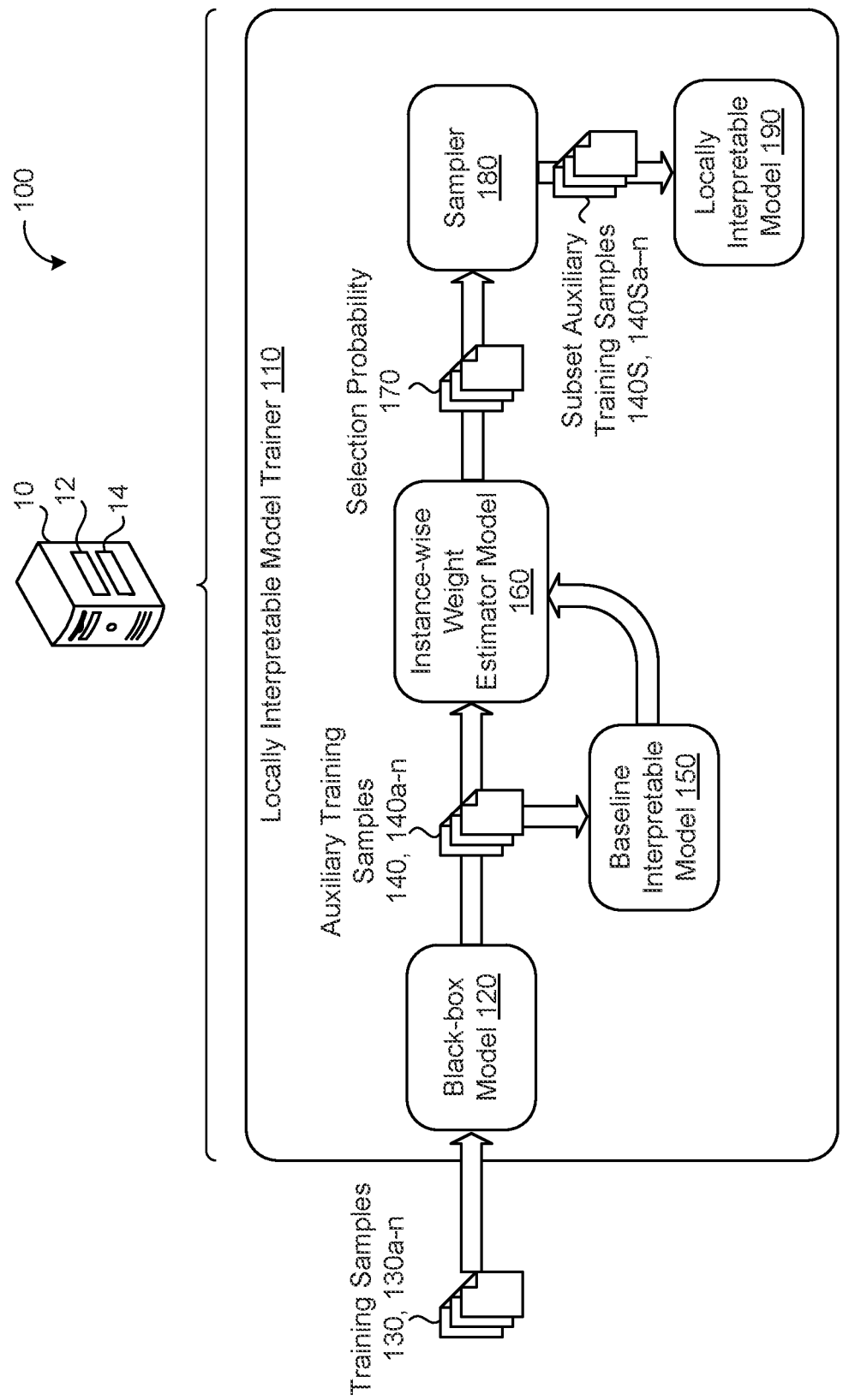
FIG. 1 is a schematic view of an example system for training a locally interpretable model.

Referring now to FIG. 1, in some implementations, an example system 100 includes a processing system 10. The processing system 10 may be a single computer, multiple computers, or a distributed system (e.g., a cloud environment) having fixed or scalable/elastic computing resources 12 (e.g., data processing hardware) and/or storage resources 14 (e.g., memory hardware). The processing system 10 executes a locally interpretable model trainer 110. The model trainer 110 trains a black-box model 120 and a locally interpretable model 190. The black-box model 120 may include any machine learning model to be explained. For example, the black-box model 120 may be a deep neural network or a decision tree-based ensemble method. The locally interpretable model 190 explains a single prediction of the black-box model 120. In particular, the locally interpretable model 190 distills knowledge from the high performance black-box model 120 to explain one or more predictions from the black-box model 120 for a user.

Figure 2A:
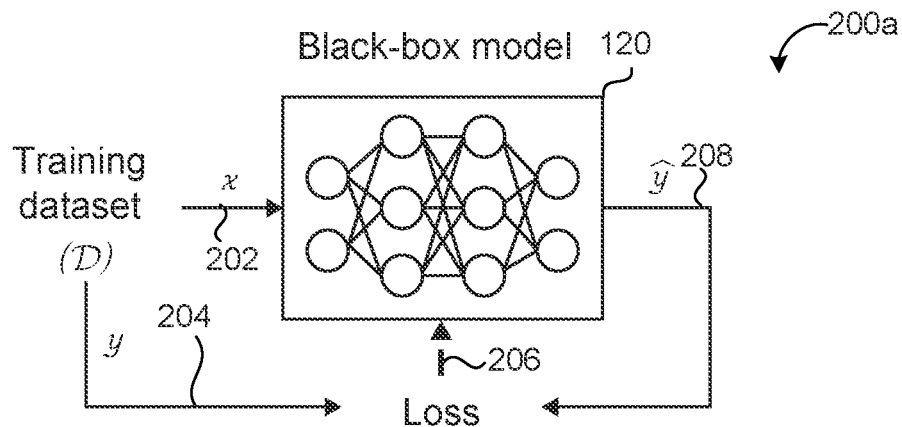
FIGS. 2A-2E are schematic views of exemplary components of the system of FIG. 1 for training the locally interpretable model.
Figure 2B:
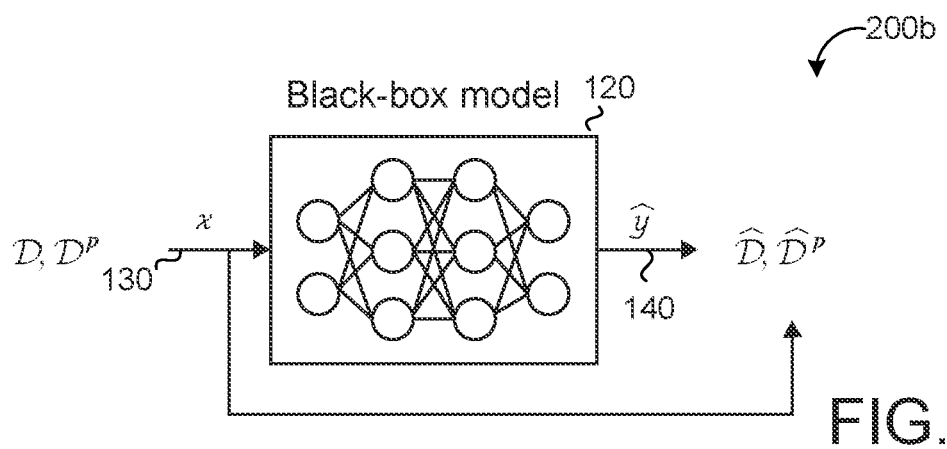

The model trainer 110 obtains a set of training samples 130, 130a-n and trains the black-box model 120 using some or all of the training samples 130 in the set. In some examples, each training sample 130 includes both training data 202 and a given label 204 for the training data 202 (FIG. 2A). The given label 204 includes annotations or other indications for the black-box model 120 to determine an accuracy of a prediction using the associated training data 202. That is, the black-box model 120 makes a prediction using the training data 202 of a training sample 130 and compare the prediction to the associated given label 204 to determine an accuracy of the prediction. In some implementations, the training sample 130 only includes training data 202 without the corresponding given label 204 (i.e., unlabeled training samples).

The model trainer 110 generates, using the trained black-box model 120 and the set of training samples 130, a set of auxiliary training samples 140, 140a-n. In some examples, the model trainer uses the auxiliary training samples 140 to evaluate the performance of the black-box model 120 to guide meta-learning. As discussed in more detail below, the auxiliary training samples 140 may include auxiliary training data and auxiliary labels based on the predictions of the black-box model 120. The model trainer 110 trains, using the set of auxiliary training samples 140, a baseline interpretable model 150. The baseline interpretable model 150 may include a globally interpretable model (e.g., linear model or shallow decision tree) optimized to replicate the predictions of the black-box model 120. The baseline interpretable model 150 may act as a benchmark while training a locally interpretable model 190.

The model trainer 110 trains an instance-wise weight estimator model 160 (also referred to herein as just an instance-wise weight estimator) using the set of auxiliary training samples 140 and the baseline interpretable model 150. The instance-wise weight estimator model 160 determines a weight (i.e., a selection probability 170) that indicates the valuableness for each auxiliary training sample 140. The greater the weight, the greater valuableness the respective auxiliary training sample 140 has for training the locally interpretable model 190. In some implementations, for each auxiliary training sample 140 in the set of auxiliary training samples 140, the trained instance-wise weight estimator model 160 determines the selection probability 170 for each auxiliary training sample 140. The selection probability 170 corresponds to a weight that indicates whether the auxiliary training sample 140 is a valuable training sample or a problematic training sample for the locally interpretable model 190 (i.e., whether the sample 140 is likely to improve training or worsen training).

The model trainer 110 includes a sampler 180 that receives the selection probability 170 of each auxiliary training sample 140 and selects a subset of the set of auxiliary training samples 140S, 140Sa-n based on the selection probability 170 assigned to each respective auxiliary training sample 140. The subset of auxiliary training samples 140S may include a lesser quantity of training samples than the auxiliary training samples 140. In some implementations, the sampler 180 determines whether the selection probability 170 of each auxiliary training sample 140 satisfies a threshold. When the selection probability 170 satisfies the threshold, the sampler 180 may add the corresponding auxiliary training samples 140 to the subset of auxiliary training samples 140S. In other implementations, the sampler 180 selects a predetermined number of the auxiliary training samples 140 (e.g., selecting a predetermined number of auxiliary training samples 140 with the highest selection probabilities 170).

The model trainer 110 trains the locally interpretable model 190 using the subset of auxiliary training samples 140S. The locally interpretable model 190, after training on the subset of auxiliary training samples 140S, generates an output (i.e., a prediction) that closely replicates the prediction performance of the black-box model 120. In some examples, the locally interpretable model 190 trains on only the subset of auxiliary training samples 140S, rather than training on the set of training samples 130 or the entire set of auxiliary training samples 140. That is, the sampler 180 selects the subset of auxiliary training samples 140S from the entire set of auxiliary training samples 140 to train the locally interpretable model 190. By training the locally interpretable model 190 on the subset of auxiliary training samples 140S, the locally interpretable model near-matches the performance of the black-box model 120 while training on only a subset of the auxiliary training samples 140.

Referring now to FIGS. 2A-E, in some implementations, each training sample 130 in the set of training samples 130 includes training data 202 and the given label 204. As shown in schematic view 200a (FIG. 2A), training the black-box model 120 may include training data 202 and the given label 204. The model trainer 110 provides the black-bock model 120 with the training data 202 and the black-box model 120 generates a prediction 208 (also referred to herein as a predicted label 208) based on the training data 202. The model trainer 110 compares the prediction 208 to the given label 204 to determine an accuracy of the prediction 208.

In some examples, the model trainer 110 trains the black-box model 120 by minimizing a loss function 206 (e.g., a mean squared error loss function or a cross-entropy loss function). The loss function 206 indicates an accuracy of the predicted label 208 determined by the black-box model 120 relative to the given label 204 from the training sample 130. For example, the loss function 206 includes calculating a mean absolute error, where a lower error indicates an optimal loss function 206. By minimizing the loss function 206, the black-box model 120 trains to accurately generate the predicted label 208 to closely match the given label 204. In some examples, the black-box model 120 trains without a given label 204 (i.e., unsupervised learning). Here, the black-box model 120 generates the predicted label 208 without comparing to the given label 204. The loss function 206 quantifies the fidelity of the predicted label 208. Results from the loss function 206 (i.e., the loss) serve as feedback to the black-box model 120 to optimize the black-box model 120.

The black-box model 120 may include any type of learning model. In some examples, the black-box model 120 is pre-trained and stored in the memory hardware 14. In this scenario, the model trainer 110 may bypass training the black-box model 120 (FIG. 2A) and instead retrieve the trained black-box model 120 from the memory hardware 14.

With continued reference to FIG. 2A, in some implementations, the training data 202 and given label 204 represent an image (e.g., an image of an object such as a bicycle). The black-box model 120 analyzes the training data 202 (e.g., the image of the bicycle) to generate the predicted label 208. The model trainer 110 compares the predicted label 208 to the given label 204 to calculate the loss function 206. In some examples, the black-box model 120 accurately generates the predicted label 208 (e.g., the black-box model 120 predicts that the image includes a bicycle when the given label 204 also indicates the image includes a bicycle) and the loss function 206 indicates a low mean absolute error. In some implementations, when the black-box model 120 inaccurately generates the predicted label 208 (e.g., the predicted label 208 indicates the input image included a car when the given label 204 indicates the input image included a bicycle), the loss function 206 indicates a high mean absolute error. The results from the loss function 206 (i.e., the calculated loss) feed back into the black-box model 120 to optimize the black-box model 120. The iterative process of calculating the loss function 206 based on training data 202 for the black-box model 120 may repeat until the loss reaches an optimal threshold.

As shown in schematic view 200b (FIG. 2B), the trained black-box model 120 creates auxiliary training samples 140. In some implementations, the model trainer 110 generates the set of auxiliary training samples 140 by obtaining, from the trained black-box model 120, using the training data 202 of a respective training sample 130, the associated predicted label 208 for the respective training sample 130. The model trainer 110 combines the training data 202 of the respective training sample 130 with the predicted label 208 to form an auxiliary training sample 140. The model trainer 110 adds the auxiliary training sample 140 to the set of auxiliary training samples 140. The model trainer 110 uses the set of auxiliary training samples 140 to train the instance-wise weight estimation model 160 and/or train the locally interpretable model 190. The auxiliary training samples 140 may include auxiliary training data and auxiliary labels. In some implementations, the auxiliary training samples 140 include probe training samples 222, 222a-n. The probe training samples 222 may be a subset of the raining samples 130 not used to train the black-box model 120. In other examples, the probe training samples 222 may be a second set of training samples independent from the set of training samples 130. In other words, the probe training samples 222 may include training data not utilized in training the instance-wise weight estimator model or baseline interpretable model 150.

Figure 2C:
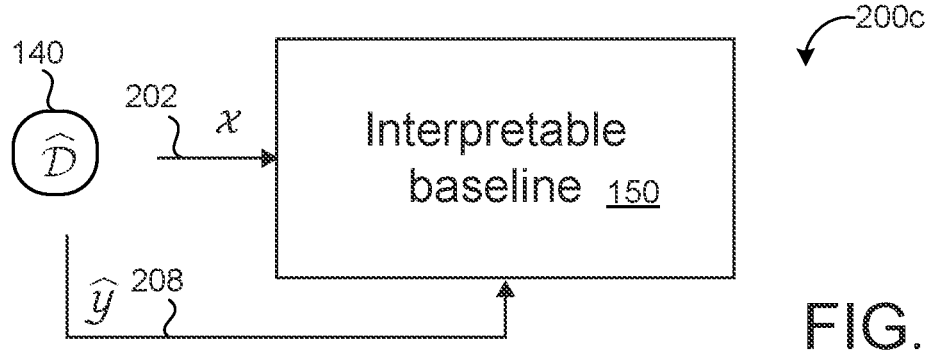
Figure 2D:
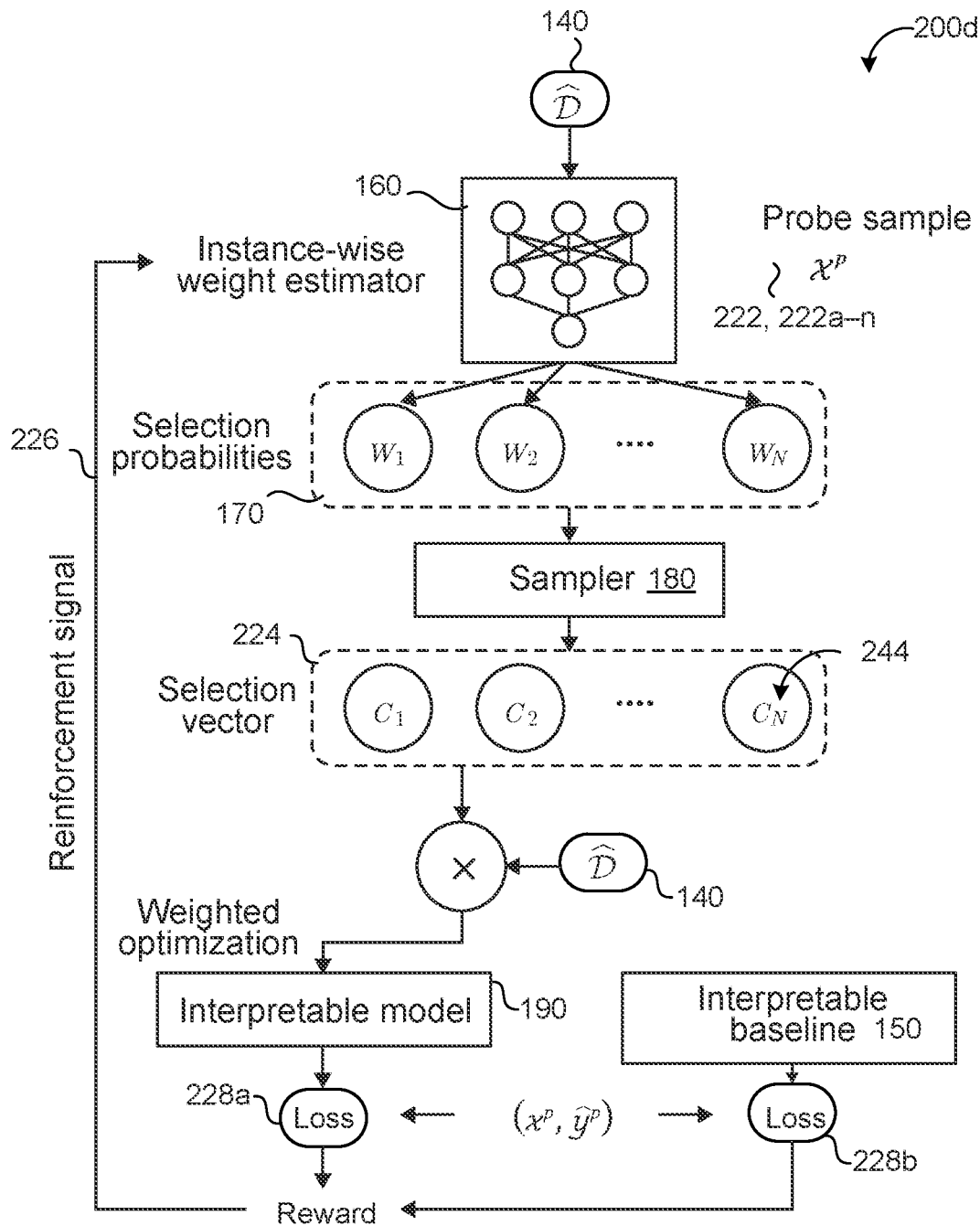
Figure 2E:
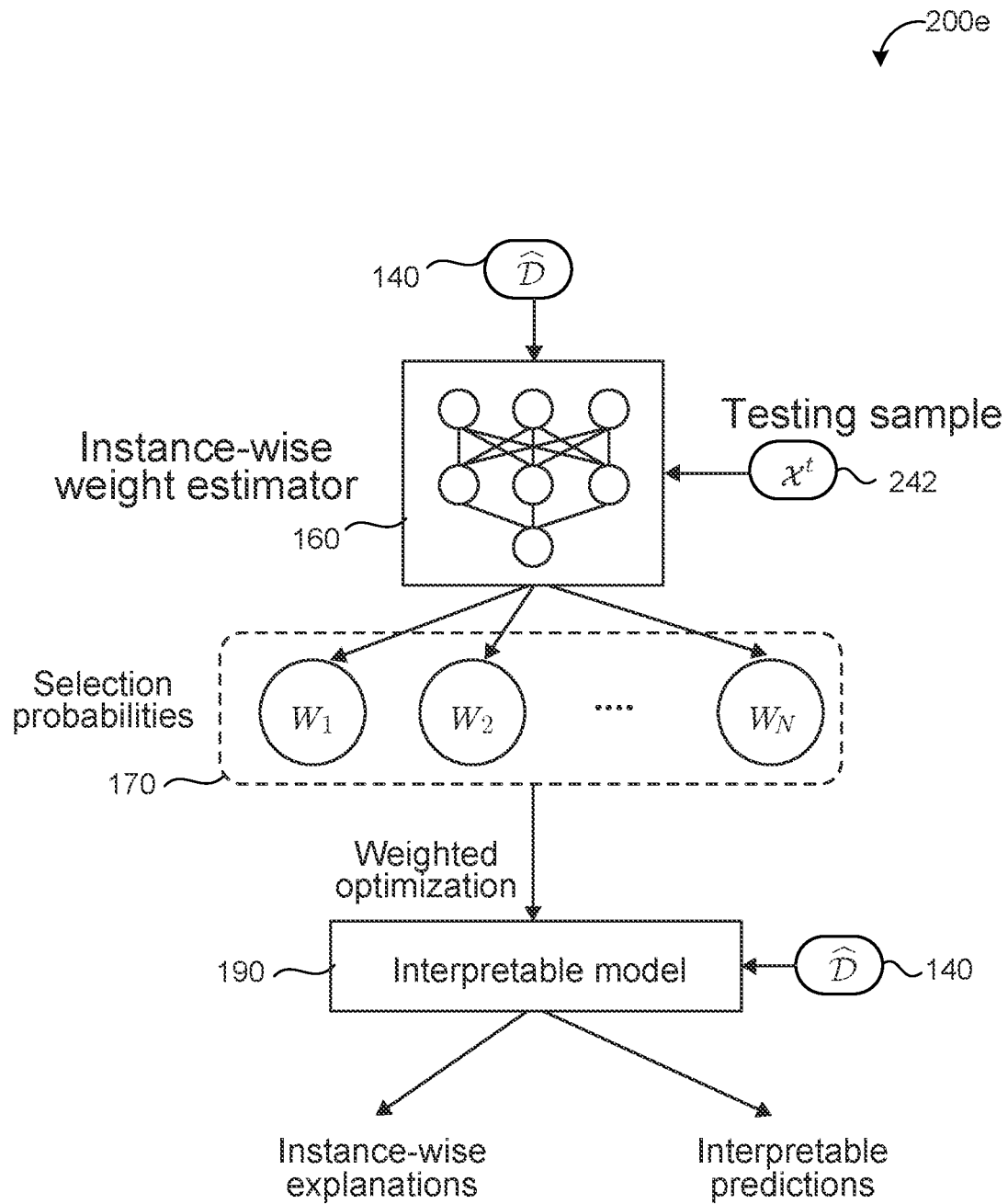

Referring now to FIG. 2C, schematic view 200c includes the baseline interpretable model 150. The model trainer 110 trains the baseline interpretable model 150 using the set of auxiliary training samples 140 (i.e., the training data 202 and the predicted label 208). The baseline interpretable model 150 improves the stability in training the instance-wise weight estimator model 160. The model trainer 10 optimizes the baseline interpretable model 150 to replicate the predictions of the black-box model 120. The baseline interpretable model 150 serves as a benchmark of performance for the locally interpretable model 190.

As shown in schematic view 200d (FIG. 2D), in some implementations, the model trainer 110, when training the instance-wise weight estimator model 160, determines a reinforcement signal 226 and updates the instance-wise weight estimator model 160 based on the reinforcement signal 226 as described in more detail below. The instance-wise weight estimator model 160 outputs instance-wise weights (i.e., selection probabilities 170) to ft the locally interpretable model 190. In some examples, the instance-wise weight estimator 160 includes a complex machine learning model (e.g., a deep neural network). The instance-wise weight estimator model 160 estimates the selection probabilities 170 of training instances that train the locally interpretable model 190.

In some implementations, to train the instance-wise weight estimator model 160, the model trainer 110 obtains the set of probe training samples 222. For each probe training sample 222 in the set of probe training samples 222, the instance-wise weight estimator model 160 estimates an associated selection probability 170. That is, the instance-wise weight estimator determines a prediction i.e., the selection probability 170) based on each probe training sample input 222. Each selection probability 170 indicates the value of the probe training sample 222 for training the locally interpretable model 190. For example, a probe training sample 222 that is valuable to train the locally interpretable model 190 has a high selection probability 170. In other examples, the training sample 130 that is low quality or problematic for training the locally interpretable model 190 has a low selection probability 170.

In some examples, the model trainer 110 trains the instance-wise weight estimator model 160 by determining, based on the selection probability 170 of each probe training sample 222, an instance-wise selection vector 224. In particular, the sampler 180 selects from the selection probabilities 170 to generate the selection vector 224. The selection vector 224 indicates the selection probability 170 for each auxiliary training sample 140 in the set of auxiliary training samples 140. In some examples, the sampler 180 adds auxiliary training samples 140 that correspond to selected selection probabilities 170 in the selection vector 224 to the subset of auxiliary training samples 140S. The selection vector 224 may include selection values 244 for each corresponding selection probability 170. The model trainer 110 trains the locally interpretable model 190 using the subset of auxiliary training samples 140S. The model trainer 110 optimizes the locally interpretable model 190 based on the instance-wise selection vector 224 and updates the instance-wise weight estimator model 160 based on loss data 228 from the optimized locally interpretable model 190.

In some examples, the model trainer 110 determines the reinforcement signal 226 by determining a first loss data 228a for the locally interpretable model 190 based on a loss function 206 and determining a second loss data 228b for the baseline interpretable model 150 based on another loss function 206. The model trainer, in some implementations, determines the reinforcement signal 226 based on the first loss data 228a for the locally interpretable model 190 and the second loss data 228b for the baseline interpretable model 150. Both the locally interpretable model 190 and the baseline interpretable model 150 calculate a loss 228a, 220b based on one or more loss functions 206. In some implementations, the model trainer 110 compares the first loss 228a of the locally interpretable model 190 to the second loss 228b of the baseline interpretable model 150. Because the outputs of the baseline interpretable model 150 closely represent the outputs of the black-box model 120, comparing the first loss 228a of the locally interpretable model 190 with the loss 228b of the baseline interpretable model 150 establishes the fidelity of the locally interpretable model 190 to the black-box model 120. The reinforcement signal 226, based on the first lost data 228a and second loss data 228b, rewards similar predictions between the locally interpretable model 190 and the baseline interpretable model 150.

In some examples, the selection probability 170 to train the instance-wise weight estimator model 160 is determined by the Equation (1):

$$p_\Phi(x_j^p, c(x_j^p)) = \prod_{i=1}^{N} \left[ h_\Phi(x_j^p, x_i, f^*(x_i))^{c_i(x_j^p)} * (1 - h_\Phi(x_j^p, x_i, f^*(x_i)))^{1-c_i(x_j^p)} \right] \quad (1)$$

In Equation (1) $p_\Phi(x^p)$ indicates the probability mass function for $c(x_j^p)$ given $h_\Phi$. Here, $h_\Phi(x^p, x, f^*(x))$ represents the instance-wise weight for each training pair $(x, f^*(x))$ for the probe data $x^p$. The binary vector $c(x_j^p) \in \{0,1\}^N$ represents the selection operation, such that $(x_i, \hat{y}_i)$ is selected for training the locally interpretable model 190 for $x_j^p$ when $c_i(x_j^p)=1$.

In some implementations, the sampler 180 yields a non-differential objective, and cannot train the instance-wise weight estimator 160 using conventional gradient descent-based optimization. Instead, the model trainer 110 utilizes a reinforce algorithm such that the sampler 180 selection is rewarded by the performance of its impact. In some examples, the loss function 206 updates the instance-wise weight estimator model 160 based on loss data from the optimized locally interpretable model 190. The loss function for the instance-wise weight estimator 160 may be expressed as:

$$\Phi^* = E_{x_j^p \sim P_x}[E_{c(x_j^p) \sim p_\Phi(x_j^p, *)}[L(f^*(x_j^p), g_{\theta(x_j^p)}(x_j^p))) + \lambda \|c(x_j^p)\|1]] \quad (2)$$

To apply the reinforce algorithm, the model trainer 110 computes the gradient of the loss function (e.g, using Equation (2)) for the instance-wise weight estimator. Using the gradient of the loss function, the following steps employ iteratively to update the parameter of the instance-wise weight estimator 160. Step 1 includes estimating instance-wise weights $w_i(x_j^p) = h_\Phi(x_j^p, x_i, \hat{y}_i)$ and instance-wise selection vector 224 $c_i(x_j^p) \sim \text{Ber}(w_i(x_j^p))$ for each training and probe instance in a mini-batch. Step 2 includes optimizing the locally interpretable model 190 with the selection vector 224 for each probe instance, $g_{\theta(x_j^p)} = \text{argmin}(g_\theta) \Sigma_{i=1}^N [c_i(x_j^p) * L_g(f^*(x_i), g_\theta(x_i))]$ (3). Step 3 includes updating the instance-wise weight estimation model 160 parameter $\Phi$.

$$\Phi \leftarrow \Phi - \frac{\alpha}{M} \sum_{j=1}^{M} \left[ L\left(f^*(x_j^p), g_{\theta(x_j^p)}(x_j^p)\right) - L_b(x_j^p) + \lambda \|c(x_j^p)\|1 \right] * \nabla_\Phi \log p_\Phi(x_j^p), (c(x_j^p)) \quad (4)$$

In equation (4), $\alpha$ is a learning rate, and $L_b(x_j^p) = L(f^*(x_j^p), g_b(x_j^p))$ is the baseline loss against the benchmark for the performance improvement. The steps described above repeat until convergence of the losses 228a, 228b.

When training the instance-wise weight estimator model 160, the model trainer 110 may determine a reinforcement signal 226 and update the instance-wise weight estimator model 160 based on the reinforcement signal 226. The reinforcement signal 226 quantifies the fidelity metric that represents how accurately the locally interpretable model 190 prediction matches the black-box model 120 prediction. For example, when the first loss 228a and second loss 228b are similar, the reinforcement signal 226 rewards the similar outcome updating the instance-wise weight estimator 160.

In some implementations, the sampler 180 selects the subset of auxiliary training samples 140S from the set of auxiliary training samples 140 by, for each auxiliary training sample 140 in the set of auxiliary training samples 140 determining, based on the selection probability 170, a corresponding selection value 244 indicating either selection or no selection. When the corresponding selection value 244 indicates selection, the sampler 180 may add the auxiliary training sample 140 into the subset of auxiliary training samples 140S. In particular, the sampler 180 selects selection probabilities 170, each corresponding to an auxiliary training sample 140, that satisfy a selection probability 170 threshold. In some implementations, the selection probabilities 170 that satisfy the threshold receive a selection value 244 that indicates selection and the sampler 180 adds the selected auxiliary training sample 140 into the subset of auxiliary training samples 140S. In contrast, selection probabilities 170 that do not satisfy the threshold receive selection value 244 that indicate no selection and are the sampler 180 does not include the auxiliary training sample 140S in the subset of auxiliary training samples 140S.

As shown in schematic view 200(e) (FIG. 2E), in some implementations, after training the instance-wise weight estimator model 160, the instance-wise weight estimator model 160 receives a validation sample 242. The validation sample 242 may include training data 202 and a given label 204. The instance-wise weight estimator model 160 generates the selection probability 170 for each auxiliary training sample 140 in the set of auxiliary training samples 140. The model trainer 110 sends the weighted optimization of the selection probabilities 170 to the locally interpretable model 190. The model trainer 110 trains the locally interpretable model 190 based on the validation sample 242 and the selection probabilities 170 of each auxiliary training sample 140S in the set of auxiliary training samples 140S. The outputs of the trained interpretable model 190 are instance-wise predictions and corresponding explanations. For example, the corresponding explanation may include local dynamics of the black-box model prediction at the validation sample 242 given by the coefficients of the fitted linear model.

Figure 3:
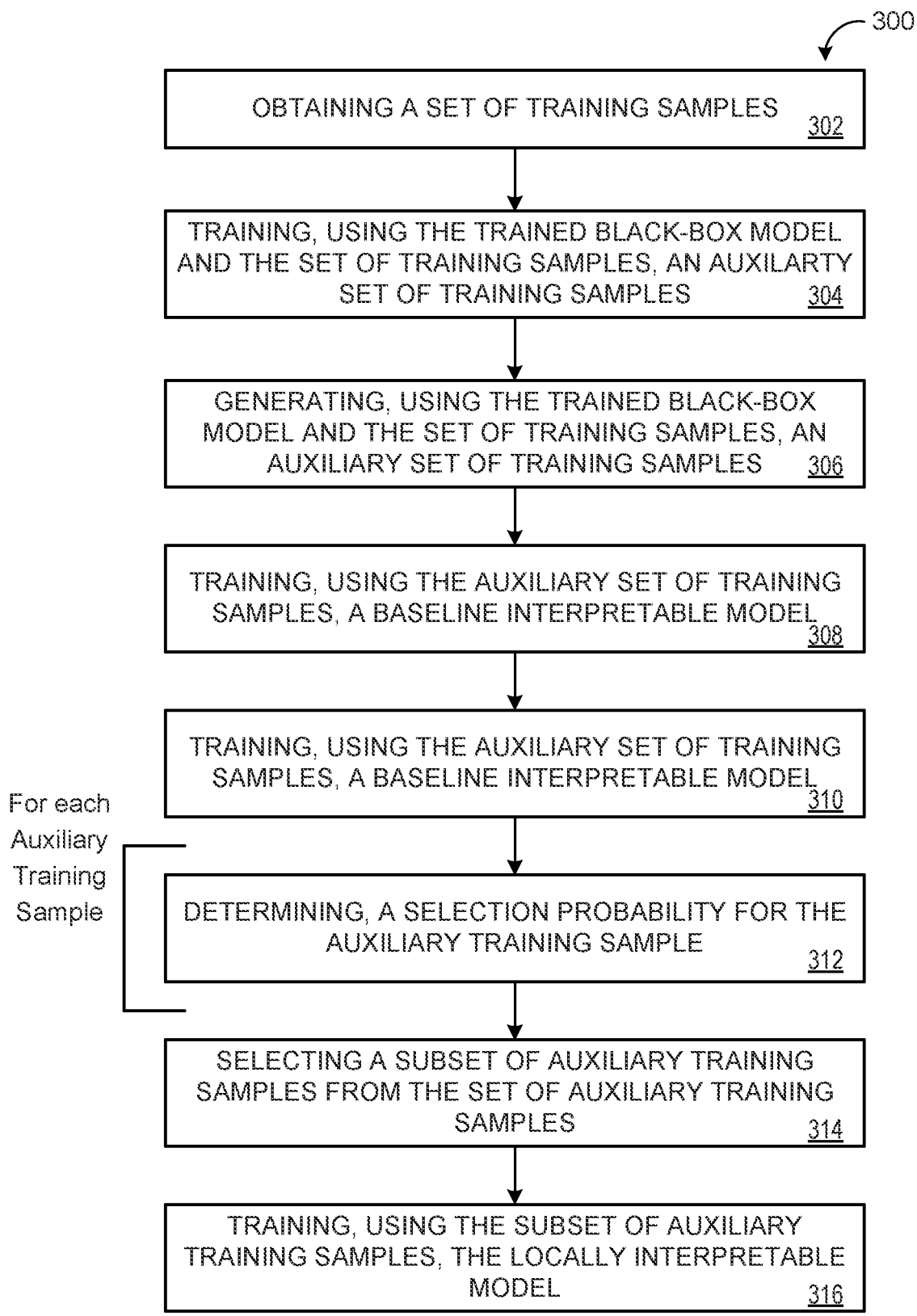
FIG. 3 is a flowchart of an example arrangement of operations for a method of training a locally interpretable model.

FIG. 3 is a flowchart of an exemplary arrangement of operations for a method 300 for training a locally interpretable model. The method 300, at operation 302, includes obtaining, at data processing hardware 12, a set of training samples 130. Each training sample 130 may include training data 202 and a given label 204. At operation 304, the method 300 includes training, by the data processing hardware 12, using the set of training samples 130, a black-box model 120. The method 300 includes, at operation 306, generating, by the data processing hardware 12, using the trained black-box model 120 and the set of training samples 130, a set of auxiliary training samples 140.

The method 300 includes, at operation 308, training, by the data processing hardware 12, using the set of auxiliary training samples 140, a baseline interpretable model 150. At operation 310, the method 300 includes, training, by the data processing hardware 12, using the set of auxiliary training samples 140 and baseline interpretable model 150, an instance-wise weight estimator model 160. At operation 312, the method 300 includes, for each auxiliary training sample 140 in the set of auxiliary training samples 140, determining, by the data processing hardware 12, using the trained instance-wise weight estimator model 160, a selection probability 170 for the auxiliary training sample 140. At operation 314, the method 300 includes, selecting, by the data processing hardware 12, based on the selection probabilities 170, a subset of auxiliary training samples 140S from the set of auxiliary training samples 140. At operation 316, the method 300 includes, using the subset of auxiliary training samples 140S, training the locally interpretable model 190.

A software application (i.e., a software resource) may refer to computer software that causes a computing device to perform a task. In some examples, a software application may be referred to as an "application," an "app," or a "program" Example applications include, but are not limited to, system diagnostic applications, system management applications, system maintenance applications, word processing applications, spreadsheet applications, messaging applications, media streaming applications, social networking applications, and gaming applications.

Figure 4:
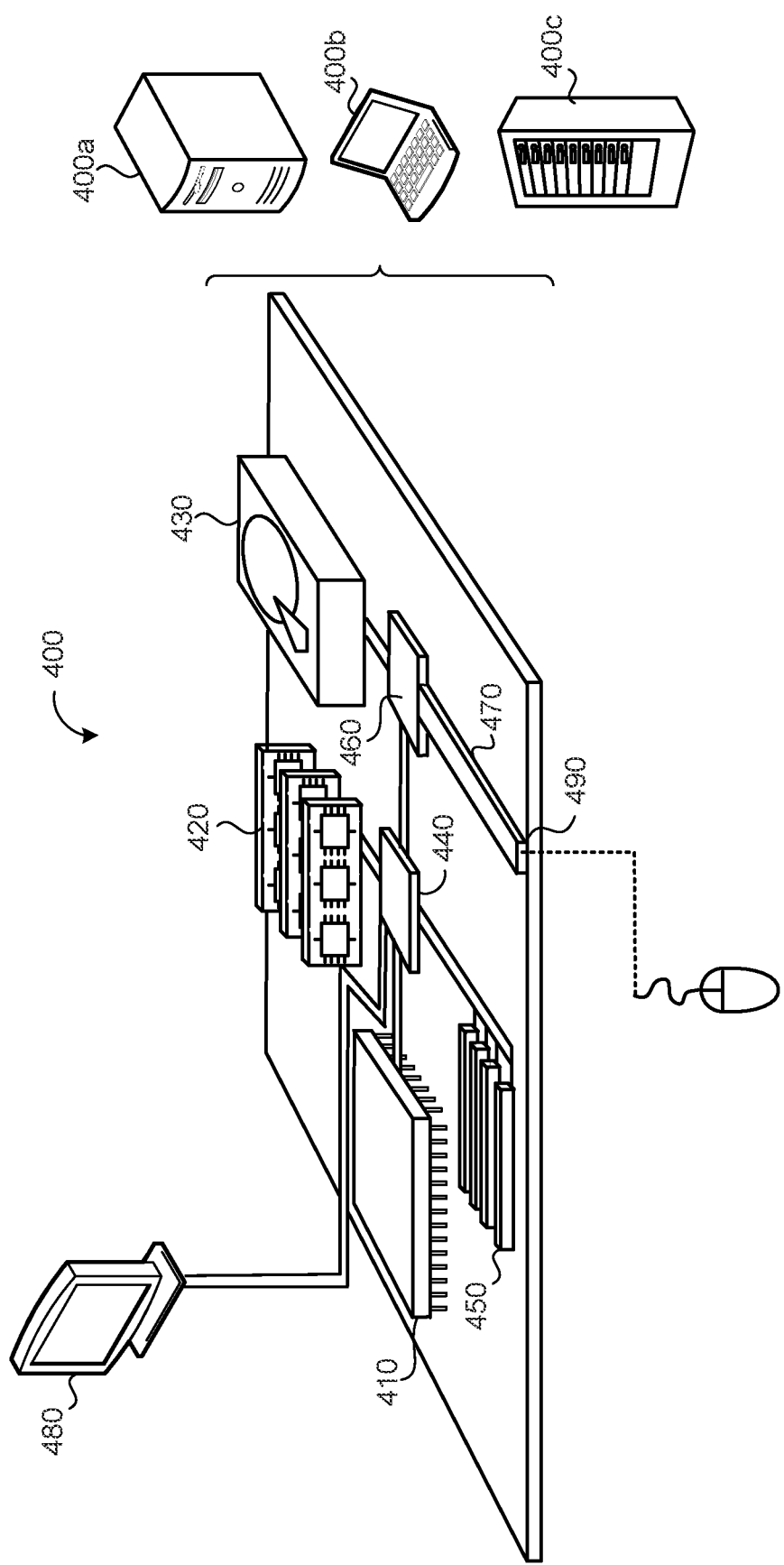
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410, memory 420, a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 430 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, or as part of a rack server system 400c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g, a CRT (cathode ray tube), LCD (liquid crystal display) monitor, or touch screen for displaying information to the user and optionally a keyboard and a pointing device, e.g, a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for training a locally interpretable model, the method comprising:
   obtaining, at data processing hardware, a set of training samples;
   training, by the data processing hardware, using the set of training samples, a black-box model;
   generating, by the data processing hardware, using the trained black-box model and the set of training samples, a set of auxiliary training samples;
   training, by the data processing hardware, using the set of auxiliary training samples, a baseline interpretable model;
   training, by the data processing hardware, using the set of auxiliary training samples and the baseline interpretable model, an instance-wise weight estimator model;
   for each auxiliary training sample in the set of auxiliary training samples, determining, by the data processing hardware, using the trained instance-wise weight estimator model, a selection probability for the auxiliary training sample;
   selecting, by the data processing hardware, based on the selection probabilities, a subset of auxiliary training samples from the set of auxiliary training samples; and
   training, by the data processing hardware, using the subset of auxiliary training samples, the locally interpretable model.

2. The method of claim 1, wherein training the instance-wise weight estimator model comprises:
   determining a reinforcement signal; and
   updating the instance-wise weight estimator model based on the reinforcement signal.

3. The method of claim 2, wherein determining the reinforcement signal comprises:
   determining first loss data for the locally interpretable model based on a loss function;
   determining second loss data for the baseline interpretable model based on the loss function; and
   determining the reinforcement signal based on the first loss data for the locally interpretable model and the second loss data for the baseline interpretable model.

4. The method of claim 1, wherein selecting the subset of auxiliary training samples from the set of auxiliary training samples comprises, for each auxiliary training sample in the set of auxiliary training samples:
   determining, based on the selection probability, a corresponding selection value indicating either selection or no selection; and
   when the corresponding selection value indicates selection, adding the auxiliary training sample into the subset of auxiliary training samples.

5. The method of claim 4, wherein determining, for each auxiliary training sample, the selection probability for the auxiliary training sample comprises:
   receiving, at the instance-wise weight estimator model, a validation sample; and
   determining, by the instance-wise weight estimator model, the selection probability based on the validation sample.

6. The method of claim 1, further comprising, after training the instance-wise weight estimator model:
   receiving, at the instance-wise weight estimator model, a validation sample;
   generating, by the instance-wise weight estimator model, the selection probability for each auxiliary training sample in the set of auxiliary training samples; and
   training the locally interpretable model based on the validation sample and the selection probabilities of each auxiliary training sample in the set of auxiliary training samples.

7. The method of claim 1, wherein training the black-box model comprises minimizing a mean squared error loss function or a cross-entropy loss function.

8. The method of claim 1, wherein each training sample in the set of training samples comprises training data and a given label.

9. The method of claim 8, wherein generating the set of auxiliary training samples comprises, for each training sample in the set of training samples:
- obtaining, from the trained black-box model, using the training data of the training sample, a predicted label for the training data;
- combining the training data and the predicted label into an auxiliary training sample; and
- adding the auxiliary training sample to the set of auxiliary training samples.

10. The method of claim 1, wherein training the instance-wise weight estimator model comprises:
- obtaining a set of probe training samples;
- for each probe training sample in the set of probe training samples, determining a selection probability;
- determining, based on the selection probability of each probe training sample, an instance-wise selection vector;
- optimizing the locally interpretable model based on the instance-wise selection vector; and
- updating the instance-wise weight estimator model based on loss data from the optimized locally interpretable model.

11. A system comprising:
- data processing hardware; and
- memory hardware in communication with the data processing hardware, the memory hardware storing instructions that when executed on the data processing hardware cause the data processing hardware to perform operations comprising:
  - obtaining a set of training samples;
  - training, using the set of training samples, a black-box model;
  - generating, using the trained black-box model and the set of training samples, a set of auxiliary training samples;
  - training, using the set of auxiliary training samples, a baseline interpretable model;
  - training, using the set of auxiliary training samples and the baseline interpretable model, an instance-wise weight estimator model;
  - for each auxiliary training sample in the set of auxiliary training samples, determining, using the trained instance-wise weight estimator model, a selection probability for the auxiliary training sample;
  - selecting, based on the selection probabilities, a subset of auxiliary training samples from the set of auxiliary training samples; and
  - training, using the subset of auxiliary training samples, a locally interpretable model.

12. The system of claim 11, wherein training the instance-wise weight estimator model comprises:
- determining a reinforcement signal; and
- updating the instance-wise weight estimator model based on the reinforcement signal.

13. The system of claim 12, wherein determining the reinforcement signal comprises:
- determining first loss data for the locally interpretable model based on a loss function;
- determining second loss data for the baseline interpretable model based on the loss function; and
- determining the reinforcement signal based on the first loss data for the locally interpretable model and the second loss data for the baseline interpretable model.

14. The system of claim 11, wherein selecting the subset of auxiliary training samples from the set of auxiliary training samples comprises, for each auxiliary training sample in the set of auxiliary training samples:
- determining, based on the selection probability, a corresponding selection value indicating either selection or no selection; and
- when the corresponding selection value indicates selection, adding the auxiliary training sample into the subset of auxiliary training samples.

15. The system of claim 14, wherein determining, for each auxiliary training sample, the selection probability for the auxiliary training sample comprises:
- receiving, at the instance-wise weight estimator model, a validation sample; and
- determining, by the instance-wise weight estimator model, the selection probability based on the validation sample.

16. The system of claim 11, wherein the operations further comprise, after training the instance-wise weight estimator model:
- receiving, at the instance-wise weight estimator model, a validation sample;
- generating, by the instance-wise weight estimator model, the selection probability for each auxiliary training sample in the set of auxiliary training samples; and
- training the locally interpretable model based on the validation sample and the selection probabilities of each auxiliary training sample in the set of auxiliary training samples.

17. The system of claim 11, wherein training the black-box model comprises minimizing a mean squared error loss function or a cross-entropy loss function.

18. The system of claim 11, wherein each training sample in the set of training samples comprises training data and a given label.

19. The system of claim 18, wherein generating the set of auxiliary training samples comprises, for each training sample in the set of training samples:
- obtaining, from the trained black-box model, using the training data of the training sample, a predicted label for the training data;
- combining the training data and the predicted label into an auxiliary training sample; and
- adding the auxiliary training sample to the set of auxiliary training samples.

20. The system of claim 11, wherein training the instance-wise weight estimator model comprises:
- obtaining a set of probe training samples;
- for each probe training sample in the set of probe training samples, determining a selection probability;
- determining, based on the selection probability of each probe training sample, an instance-wise selection vector;
- optimizing the locally interpretable model based on the instance-wise selection vector; and
- updating the instance-wise weight estimator model based on loss data from the optimized locally interpretable model.

* * * * *